(12) United States Patent
LeKuch et al.

(10) Patent No.: US 7,542,895 B2
(45) Date of Patent: Jun. 2, 2009

(54) FRONT OF SCREEN, USER INTERFACE, AND NATIONAL LANGUAGE SUPPORT BY DOWNLOADING BITMAPS FROM A PC TO A COMPANION DEVICE

(75) Inventors: Scott LeKuch, New York, NY (US); Ken Inoue, Elmsford, NY (US); Dan Peter Dumarot, Cornwall, NY (US); Mary R. Seminara, Ossining, NY (US); Sreenivasulu Kesavarapu, Terrytown, NY (US); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/854,977

(22) Filed: May 14, 2001

(65) Prior Publication Data

US 2002/0049722 A1 Apr. 25, 2002

(51) Int. Cl.
*G06F 17/21* (2006.01)
(52) U.S. Cl. ............... 704/10; 704/7; 704/9; 704/3
(58) Field of Classification Search ......... 345/467–469; 704/1–10, 277; 709/246, 217, 219, 206; 707/1–10
See application file for complete search history.

(56) References Cited

U.S. PATENT DOCUMENTS

| 6,185,604 | B1 * | 2/2001 | Sekiguchi ............ 709/206 |
| 6,252,671 | B1 * | 6/2001 | Peng et al. ............ 358/1.11 |
| 6,445,458 | B1 * | 9/2002 | Focazio et al. ........ 358/1.11 |
| 6,601,108 | B1 * | 7/2003 | Marmor ................ 709/246 |

OTHER PUBLICATIONS

Adobe Systems Incorporated, "Glyph Bitmap (BDF) Distribution Specification", published Mar. 22, 1993.*
Jukka Korpela, "A tutorial on character code issues," http://www.cs.tut.fi/~jkorpela/chars.html.*

* cited by examiner

*Primary Examiner*—Huyen X. Vo
(74) *Attorney, Agent, or Firm*—Michael J. Buchenhorner; Vazken Alexanian

(57) ABSTRACT

A computing system includes a companion computing device having a display and a controller for transmitting a request to a host computing device; a host computing device for providing a user interface element and language support to the companion computing device; and a communication link for providing a bi-directional communication channel between the companion computing device and the host computing device.

15 Claims, 4 Drawing Sheets

FRONT OF SCREEN, USER INTERFACE, AND NATIONAL LANGUAGE SUPPORT BY DOWNLOADING BITMAPS FROM A PC TO A COMPANION DEVICE

CROSS-REFERENCE TO RELATED APPLICATIONS

This application is related to U.S. Patent Application "EXTENDING THE GUI DESKTOP/PAPER METAPHOR TO INCORPORATE PHYSICAL PAPER INPUT", Ser. No. 09/854,978, filed on even date herewith for Applicants D. Dumarot, et al.; U.S. Patent Application "DIGITIZER COMPANION SUBSYSTEM TO EXTEND PC BATTERY LIFE", Ser. No. 09/854,980, filed on even date herewith for Applicants D. Dumarot, et al.

BACKGROUND OF THE INVENTION

1. Field of the Invention

The present invention is related to the field of companion computer devices and more specifically, pertains to the graphical user interfaces (GUI) of companion computing devices.

2. Description of the Related Art

Electronic devices distributed in a worldwide marketplace are faced with the challenge of having their user interfaces tailored for multiple languages. The challenge is greater for small "companion" processing devices that have limited processor and memory resources. Due to their limited resources, companion devices are not typically capable of holding all of the user interface elements for each language that they must support. This creates the problem that each companion device must be programmed for a specific language, typically at the time the companion device is manufactured. The manufacturing setup for each language build, and the maintenance of separate inventories for each language, adds to manufacturing cycle and costs.

SUMMARY OF THE INVENTION

It is an objective of this invention to provide a system and/or method for supporting a user interface and language support to a companion computing device.

The foregoing and other problems are overcome and the objectives of the invention are realized by methods and apparatus in accordance with the invention disclosed herein. The present invention pertains to a computing system that includes a companion computing device having a display and a controller for transmitting a request to a host computing device; a host computing device for providing a requested user interface element and language support to the companion computing device; and a communication link for providing a bi-directional communication channel between the companion computing device and the host computing device.

BRIEF DESCRIPTION OF THE DRAWINGS

The above set forth and other features of the present teachings are made more apparent in the ensuing Detailed Description of the Invention when read in conjunction with the attached Drawings, wherein.

DETAILED DESCRIPTION OF THE INVENTION

Figure 1:
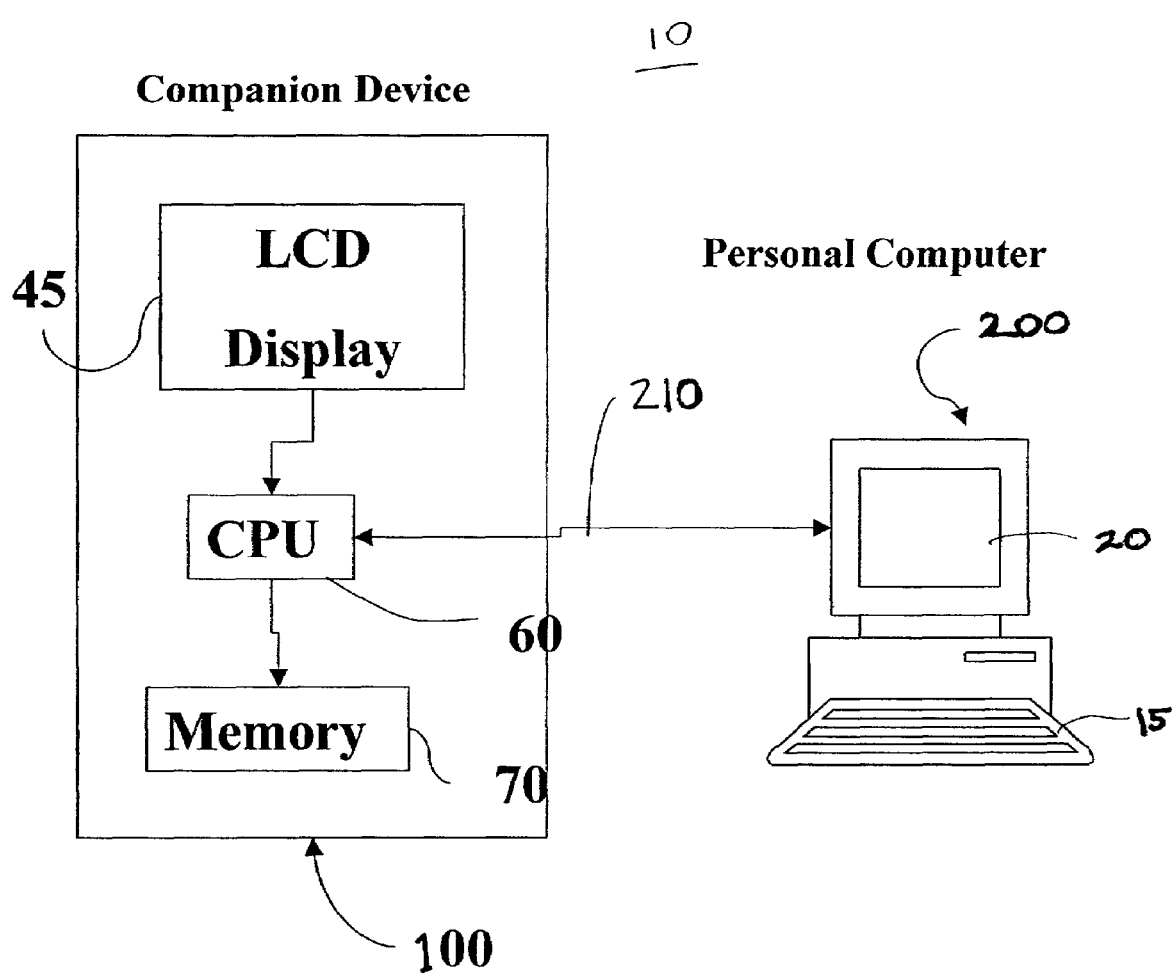
FIG. 1 depicts a computing system in accordance with the teachings herein, the system including a companion device interfaced with a host computing device.

FIG. 1 is depicts an overview of an integrated computing system 10. Computing system 10 includes a computing device such as, but not limited to, a PC (personal computer) 200 interfaced with an input computing device. It is shown that companion computing device 100 includes a CPU 60 and a memory 70. CPU 60 is preferably a general purpose microprocessor, though not limited to such, for providing system logic and control of companion computing device 100. Memory 70 is preferably flash RAM, but other forms of memory storage may be used such as, but not limited to, static RAM, or a hard drive. Memory 70 provides local storage capability for companion computing device 100. Companion computing device 100 also preferably includes a display, such as, LCD display 45, for displaying information related to, for example, a graphical user interface (GUI). CPU 60 and memory 70 provide local processing and storage, respectively, of display elements.

Companion computing device 100 may be a handheld PC, a personal digital assistant (PDA), a phone, an internet appliance, a digitizer tablet or system having an electronic pen or stylus, or other devices.

PC 200 preferably includes a display screen 20, a keyboard 15, a CPU for executing operating system and application instructions, random access memory (RAM) for temporary storage of data, and read only memory (ROM) for permanent storage of data that can include instructions for implementing the PC operating system. PC 200 may also include, or provide means for coupling to, peripheral devices, such as, but not limited to a network card, memory storage/playback devices (e.g., a removable magnetic disk, a read/write DVD and CD-ROM players), etc.

Figure 2:
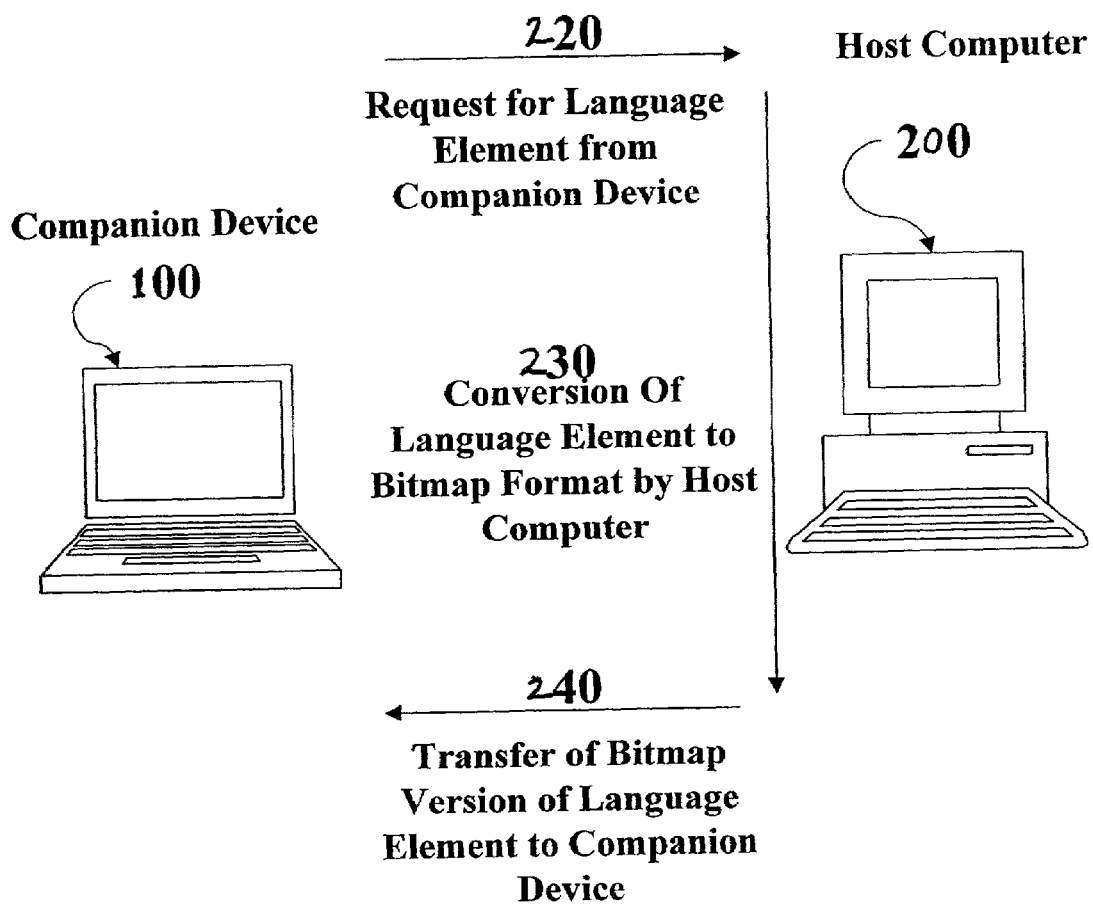
FIG. 2 illustrates a flow diagram of a method used by the computing system shown in FIG. 1 for achieving improved language support.

In FIG. 2, the flow of information for providing multiple language support, user interface upgrades, and other types of operational support to companion device 100 from PC 200 is shown. The memory resources of companion device 100, for example, a portable personal digital assistant (PDA), may be relatively limited in comparison to the memory resources of PC 200. PC 200 may be relied upon for providing multiple language support and user interface upgrade support to companion device 100. The memory requirements needed to store all of the language elements for a given language are large. Thus, permanently storing the user interface elements for multiple languages desired by some users and manufacturers of companion devices in local memory 70 is typically not practical given the limited memory and processing capabilities of many companion devices. Accordingly, the companion device 100 sends a request for a required language element to PC 200 over communication link 210 (step 220).

In accord with an aspect of the present invention, several types of requests may be supported. A first request sent by the companion device 100 is a "Request for a Language Element" (step 220). A language element may be any type of message presented to the user, for example, an alphanumeric string or a graphic symbol.

PC 200 responds to the request for a language element from the companion device 100 by referencing the requested language element in a database in, or at least accessible to, PC 200. The request may be, for example, for the letter "a" in English when the companion device's user interface is programmed to display only Chinese characters on the user interface. PC 200 preferably converts the requested language element into a display format suitable for display, such as a bitmap representation, by companion device 100 (step 230).

The result of the conversion is preferably, but not limited to, a graphical image of the requested language element that can be displayed on companion device 100. Preferably the language element provided by PC 200 in response to the request of companion device 100 requires a minimum of processing and storage requirements of companion device 100. The converted language element is then sent to the companion device 100 over communication link 210 (step 240). Companion device 100 receives and stores the converted language element, ready for presentation and use by the companion device 100.

In the above described manner, a user of companion device 100 can work in a language that is not initially supported by companion device 100, and the more limited resources of the companion device 100 are used most efficiently by having the PC 200 provide the necessary language storage and conversion. Furthermore, the display of bitmaps is relatively resource efficient.

Figure 3:
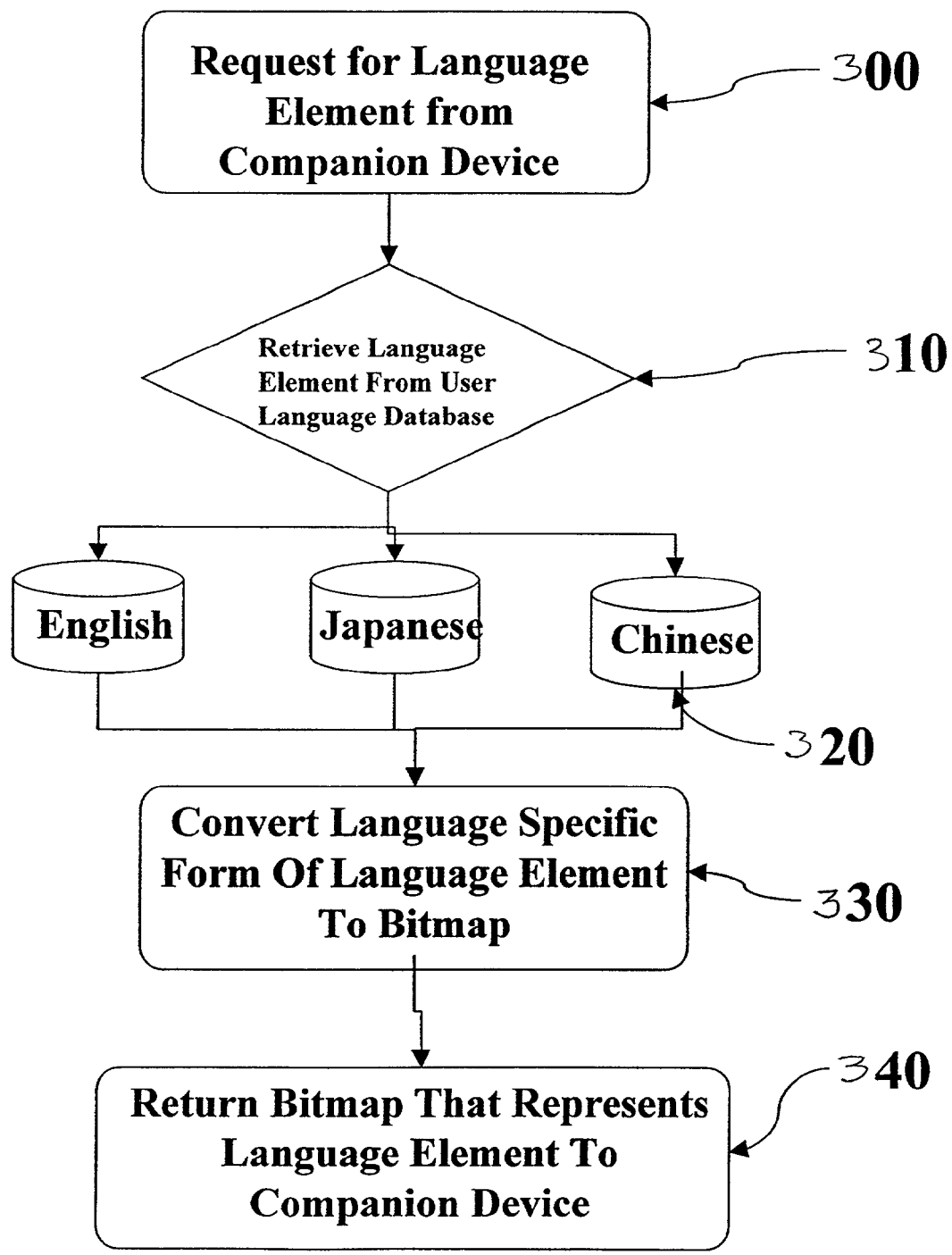
FIG. 3 is a logical flow diagram of a method used by the computing system of FIG. 1 to respond to a request for a language element.

FIG. 3 is a logical flow diagram of the steps performed by PC 200 in providing the language support in accordance with the teachings herein. PC 200 first receives the request for a specific language element from an interfaced companion device 100 (step 300). A determination is then made as to which language the user is requesting (step 310). That is, based on the particular language element of the request, PC 200 determines which language the companion device 100 requires support for, and then commences to provide the appropriate language support to companion device 100. PC 200 next performs the task of referencing an appropriate language database containing the requested language element for the determined, desired language (step 320). The example presented in FIG. 3 supports, but is not limited to, the languages of English, Japanese, and Chinese. Note, the illustrative number and particular languages used herein are not exhaustive and are not meant as limitations on the present teachings.

The requested language element is retrieved from a database as, for example, an ASCII code string. The requested characters in the ASCII string are then converted to a bitmap version of the ASCII code string for display by companion device 100 (step 330). The bitmap version of the requested language element is then transferred to companion device 100 for use and display by companion device 100 (step 340).

Note that the requested language element may be stored in a variety of formats and is not limited to being stored as an ASCII code string. For example, the requested language element may be stored as a Unicode code string. Storing the requested language element as a Unicode code string offers the benefit of being able to represent over 65,000 unique characters. This feature provides an advantage since the system and methods of the present invention may be used globally, thus requiring support for numerous languages and characters.

As illustrated by the above discussed language support example, the companion device 100 need not perform any language conversion steps or even intelligently 'understand' (i.e., process) the converted language element(s), since the requested language element is presented to the companion device 100 as a graphical image (e.g., a bitmap of the desired language element) that can be displayed on a display of the companion device 100 (e.g., LCD 45 of FIG. 1), preferably with little or no processing required.

Figure 4:
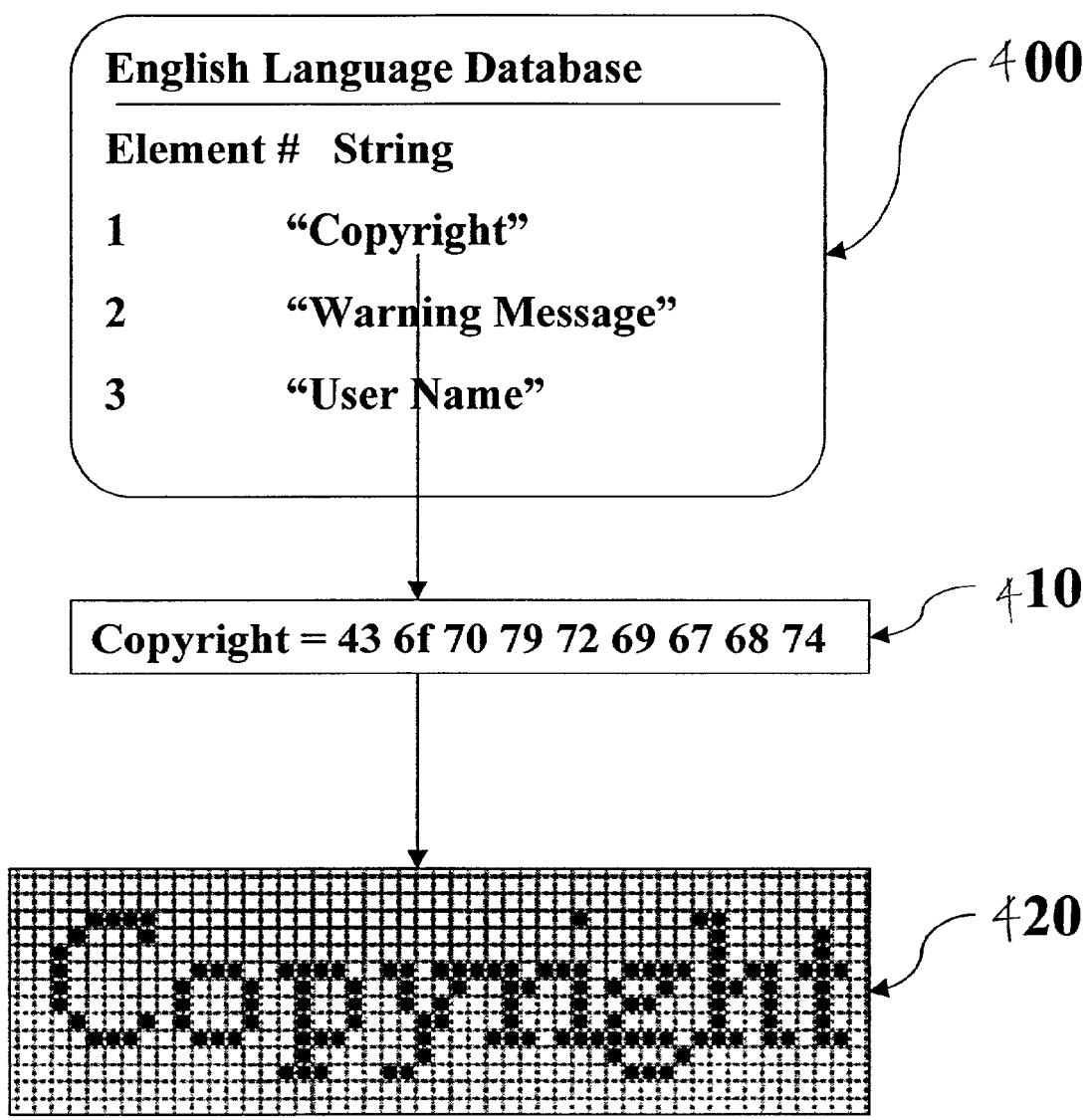
FIG. 4 is a depiction of an exemplary operation of the computing system of FIG. 1 in providing improved language support in accordance with the teachings herein.

Additional details of the string conversion process, see FIG. 3, step 330, are shown in flow diagram FIG. 4. In FIG. 4, companion device 100 requests a language element #1. In the example presented, element #1 corresponds to the English word "copyright". The request, as stated above, can be any alphanumeric or graphic, including strings composed of multiple alphanumeric characters or graphic elements. The English language database is shown in this example but could be any language supported by PC 200, as discussed above. Characters representative of language element #1 in English are then retrieved from the appropriate database in extended ASCII form (step 410).

As a continuing step in the language element conversion process, the ASCII code is converted to bitmap form by known types of operating system routines for converting ASCII characters to character font images (step 420). The bitmaps representative of the requested language element(s) are then transferred to companion device 100 to complete the language support process in accordance with the teachings herein (see FIG. 3, step 340).

It should be appreciated by those skilled in the art that the language element conversion process performed by PC 200 may include information specifying the font type, size and characteristics that are needed for properly spaced, sized and shaped characters to display on the companion device 100. It is further noted that the language elements in the referenced language databases are not limited to being stored as character strings. In one aspect of the present invention, the bitmap images are stored in the database accessed by PC 200 instead of character strings. Thus, for example, a bitmap image of the word "copyright" may be stored in place of the corresponding ASCII codes. Images of language-specific GUI items, such as icons, may also be supported in accordance with the teachings herein.

Although described above in the context of specific input device systems and computer systems, those skilled in the art should appreciate that these are exemplary and indicative of presently preferred embodiments of these teachings, and are not to be read or construed in a limiting sense upon these teachings. For example, the systems and/or methods disclosed herein may be implemented by a computer readable storage medium (e.g., a memory card or hard disk) having program instructions therein for executing the methods of the present invention.

For example, the present invention may be implemented by a computer readable storage medium. (e.g., a removable storage medium, a memory card or a hard disk) having program instructions embodied therein. The computer readable storage medium can be read and the program instructions executed by the CPU 60. Accordingly, the method for providing language support to a companion device is accomplished by program instructions for transmitting a request for a language element to a host computing device from a companion computing device; program instructions for receiving the request for the language element at the host computing device; and program instructions that are responsive to the receipt of the request for the language element by the host computing device for transmitting to the companion computing device an image, such as a bitmapped representation of the requested language element, over a communication link for display by the companion computing device.

Thus, while the invention has been particularly shown and described with respect to preferred embodiments thereof, it will be understood by those skilled in the art that changes in form and details may be made therein without departing from the scope and spirit of the invention.

What we claim is:

1. A computing system comprising:
   at least one database for storing a plurality of language specific elements;
   a companion computing device comprising:
      a display device for presenting a bitmap image as a full screen image;
      a digitizer input system for receiving a user request for a language element;
      memory storage for storing a language specific element received as the bitmap image, said storing occurring without conversion from character codes to graphic elements; and
      a control device comprising program logic for transmitting the user request for the language element to the host computing device over a communication link, wherein the requested language element is in a language not supported by the companion computing device, and wherein the user request comprises display attributes for formatting a display of the requested language element on the display device;
   a host computing device with access to the at least one database in which the plurality of language specific elements are stored in the language not supported by the companion device;
   wherein the host computing device comprises processing instructions for:
      receiving the request for the language specific element from the companion computing device;
      deriving from the request for the language specific element, a specific language;
      referencing the at least one database comprising the plurality of language specific elements stored in the specific language;
      retrieving the language specific element from the database that matches the language element;
      transmitting the language specific element as the bitmap image to the companion computing device; and
   the communication link for bi-directionally providing a communication channel between the host computing device and the companion computing device.

2. The computing system of claim 1 wherein said requested language element comprises a character set of a graphic icon.

3. The computing system of claim 1 wherein the companion computing device stores the bitmap image transmitted from said host computing device for later use.

4. The computing system of claim 1 the digitizer input system comprises an electronic pen or stylus for handwritten information.

5. The computing system of claim 1 wherein said communication link is a wired or wireless communication link.

6. A method of providing language element support to a companion computing device from a host computing device, said method comprising the steps of:
   storing in a database a plurality of language specific elements;
   using a display device for presenting a bitmap image as a full screen image;
   using a digitizer input system for receiving a user request for a language element;
   using memory storage for storing a language specific element received as the bitmap image, said storing occurring without conversion from character codes to graphic elements;
   using a control device comprising program logic for transmitting the user request for the language element to the host computing device over a communication link, wherein the requested language element is in a language not supported by the companion computing device, and wherein the user request comprises display attributes for formatting a display of the requested language element on the display device;
   using a host computing device with access to the at least one database in which the plurality of language specific elements are stored in the language not supported by the companion device;
   wherein the host computing device comprises processing instructions for:
      using an interface for receiving the request for the language specific element from the companion computing device;
      deriving from the request for the language specific element, a specific language;
      referencing the at least one database comprising the plurality of language specific elements stored in the specific language;
      retrieving the language specific element from the database that matches the language element;
      transmitting the language specific element as the bitmap image to the companion computing device; and
   using a bi-directional communication link for providing a communication channel between the host computing device and the companion computing device.

7. The method of claim 6 wherein the second language element further comprises a character set or a graphic icon.

8. The method of claim 6 wherein individual ones of a plurality of said databases are each associated with a different one of said specific languages.

9. The method of claim 6 wherein said companion computing device stores the bitmap representation transmitted from said host computing device in its local memory for later use.

10. The method of claim 6 wherein the digitizer input system comprises a pen input device for inputting written information.

11. The method of claim 6 wherein said first and second language elements are transmitted over a wired or a wireless communication link.

12. A computer readable storage medium comprising computer readable program instructions embodied therein, said program instructions enabling a computer to:
   present a bitmap image as a full screen image on a companion computing device;
   receive a user request for a language element;
   store a language specific element received as the bitmap image, wherein said image is stored without conversion from character codes to graphic elements;
   transmit from the companion computing device to a host computing device a user request for the language element in a language not initially supported by said companion device, wherein said request is initiated by the user implementing a digitizer input system of the companion computing device, and wherein the request comprises:
      display attributes for formatting the language element for display on the companion device;
   wherein said language element is one of a plurality of language specific elements stored in at least one database in a plurality of different languages that includes said language, wherein said host computing device has access to said at least one database;

wherein the host computing device has access to the at least one database and
  receives the request for the language specific element from the companion computing device;
  derives from the request for the language specific element, a specific language;
  references the at least one database comprising the plurality of language specific elements stored in the specific language;
  retrieves said language specific element from said database that matches the requested language element;
  transmits the language specific element as the bitmap image to said companion computing device;
receive from the host computing device the bit map representation of the language specific element, and
display the bitmap representation as the full screen image on the display device without conversion from character codes to graphic elements.

13. The storage medium of claim 12, wherein the language element further comprises a character set or a graphic icon, and wherein said database is associated with said language.

14. The storage medium of claim 12, further comprising program instructions for enabling said companion computing device to store the bitmap representation transmitted from said host computing device.

15. The computing system of claim 1 wherein individual ones of a plurality of said databases are each associated with a different one of said languages.

* * * * *